(12) United States Patent
Whitehill et al.

(10) Patent No.: US 9,104,905 B2
(45) Date of Patent: Aug. 11, 2015

(54) AUTOMATIC ANALYSIS OF INDIVIDUAL PREFERENCES FOR ATTRACTIVENESS

(71) Applicant: Machine Perception Technologies Inc., San Diego, CA (US)

(72) Inventors: Jacob Whitehill, Cambridge, MA (US); Javier R. Movellan, La Jolla, CA (US); Ian Fasel, San Diego, CA (US)

(73) Assignee: Emotient, Inc., San Diego, CA (US)

(*) Notice: Subject to any disclaimer, the term of this patent is extended or adjusted under 35 U.S.C. 154(b) by 63 days.

(21) Appl. No.: 13/886,198

(22) Filed: May 2, 2013

(65) Prior Publication Data
US 2014/0328536 A1 Nov. 6, 2014

(51) Int. Cl.
*G06K 9/62* (2006.01)
*G06K 9/00* (2006.01)
*G06F 17/30* (2006.01)

(52) U.S. Cl.
CPC ............ *G06K 9/00221* (2013.01); *G06F 17/30* (2013.01); *G06F 17/30247* (2013.01); *G06K 9/00302* (2013.01); *G06K 9/6263* (2013.01)

(58) Field of Classification Search
None
See application file for complete search history.

(56) References Cited

U.S. PATENT DOCUMENTS

| | | | | |
|---|---|---|---|---|
| 8,208,694 | B2* | 6/2012 | Jelonek et al. | 382/118 |
| 8,429,173 | B1* | 4/2013 | Rosenberg et al. | 707/748 |
| 8,935,246 | B2* | 1/2015 | Bengio et al. | 707/736 |
| 2003/0043194 | A1* | 3/2003 | Lif | 345/764 |
| 2005/0086211 | A1* | 4/2005 | Mayer | 707/3 |
| 2006/0018522 | A1* | 1/2006 | Sunzeri et al. | 382/118 |
| 2006/0074902 | A1* | 4/2006 | Anderson et al. | 707/5 |
| 2008/0005166 | A1* | 1/2008 | Cragun et al. | 707/104.1 |
| 2008/0075336 | A1* | 3/2008 | Luo et al. | 382/118 |
| 2010/0086215 | A1* | 4/2010 | Bartlett et al. | 382/197 |
| 2013/0113814 | A1* | 5/2013 | Howard | 345/522 |
| 2013/0282630 | A1* | 10/2013 | Attenberg et al. | 706/12 |

* cited by examiner

Primary Examiner — Li Liu
(74) Attorney, Agent, or Firm — Fenwick & West LLP

(57) ABSTRACT

A method facilitates selection of candidate matches for an individual from a database of potential applicants. A filter is calculated for the individual by processing images of people in conjunction with the individual's preferences with respect to those images. Feature sets are calculated for the potential applicants by processing images of the potential applicants. The filter is then applied to the feature sets to select candidate matches for the individual.

25 Claims, 6 Drawing Sheets

AUTOMATIC ANALYSIS OF INDIVIDUAL PREFERENCES FOR ATTRACTIVENESS

BACKGROUND OF THE INVENTION

1. Field of the Invention

This invention relates generally to automatic analysis of individual preferences for other humans based on what they look like, for example as may be used in a machine learning system to develop personalized filters for individuals to be used in selecting candidate matches for those individuals.

2. Description of the Related Art

The study of human attractiveness brings together questions of aesthetics, emotion, biology, and computation. Evolutionary psychology points to three major characteristics that contribute to attractiveness cross-culturally for both genders: symmetry, averageness, and non-average sexual dimorphic features. Although there are some traits that are generally recognized, for example, a symmetric face is more attractive than a non-symmetric one, it is rather difficult to quantify the importance and relevance of each of the above characteristics in determining whether a human is attractive or not.

In addition, attractiveness is a personalized concept. As the old saying goes, "Beauty is in the eye of the beholder." One person may find some person particularly attractive, while others may have a different opinion about the same person. For example, one person may find the person attractive because of his blue eyes, while others may find his blue eyes off-putting. Alternately, different people may find a particular person attractive, but for completely different reasons. For example, some people may find that person's eyes attractive, while other people may find that person's mouth attractive. It is difficult to generalize what one person finds attractive to predictions of how other people may perceive the same subject.

In the era of modern communication, dating and other forms of match making have become an online activity in addition to the traditional offline activity. There are many internet dating websites that facilitate people's dating needs. Typically, these internet dating websites contain thousands or more user profiles from which people may choose potential dates. However, people generally date other people whom they find attractive but attractiveness varies from one person to the next. This creates a problem: how to effectively find potential dates for a given user?

Traditionally, written questionnaires are used as filters to find potential dates. For example, a user of an internet dating website provides a list of requirements for a potential date, such as the preferred age, height, weight, education, location, etc. The internet dating website then uses this list of requirements to find potential matches in other users' profiles. However, this approach has a significant drawback, in that much of the information which people use to find potential dates is non-verbal. For example, a lot of non-verbal information is contained in a person's picture. The appearance of the person's face, the person's facial expression, the person's attire, and even the background in which the person appears can play important roles in determining whether the person in the picture is considered attractive or not. However, this non-verbal information can be difficult to communicate in a written questionnaire.

Thus, there is a need for improved techniques to process non-verbal information, such as a person's picture, for example to facilitate the task of finding potential matches for people.

SUMMARY OF THE INVENTION

The present invention overcomes the limitations of the prior art by automatically learning an individual's image-based preferences and then applying those to images of potential applicants to find candidate matches. In one approach, a filter is calculated for an individual by processing images of people in conjunction with the individual's preferences with respect to those images. Features sets are calculated for potential applicants, also by processing images of the potential applicants. The individual's filter is applied to the feature sets to select candidate matches for the individual.

In one aspect, the filter is trained using machine learning based on the images of the people and the individual's preferences with respect to those images. In a particular approach, the training of the filter is done via collaborative training, where a group of other individuals who have similar preferences as the individual is identified and the individual's filter is trained based on the other individuals' preferences with respect to images of people.

In another aspect, the images of the potential applicants are segmented into face, body, and background. The feature sets are then calculated based on the face, body, and/or background.

In another aspect, the filter is calculated by processing images of identifiable features of people's faces (e.g., mouth, eyes, nose) in conjunction with the individual's preferences with respect to those images. The feature sets for the potential applicants are calculated by processing images of the identifiable features of the potential applicants.

Other aspects of the invention include methods, devices, systems, and applications related to the approaches described above and its variants.

BRIEF DESCRIPTION OF THE DRAWINGS

The invention has other advantages and features which will be more readily apparent from the following detailed description of the invention and the appended claims, when taken in conjunction with the accompanying drawings, in which:

Figure 1:
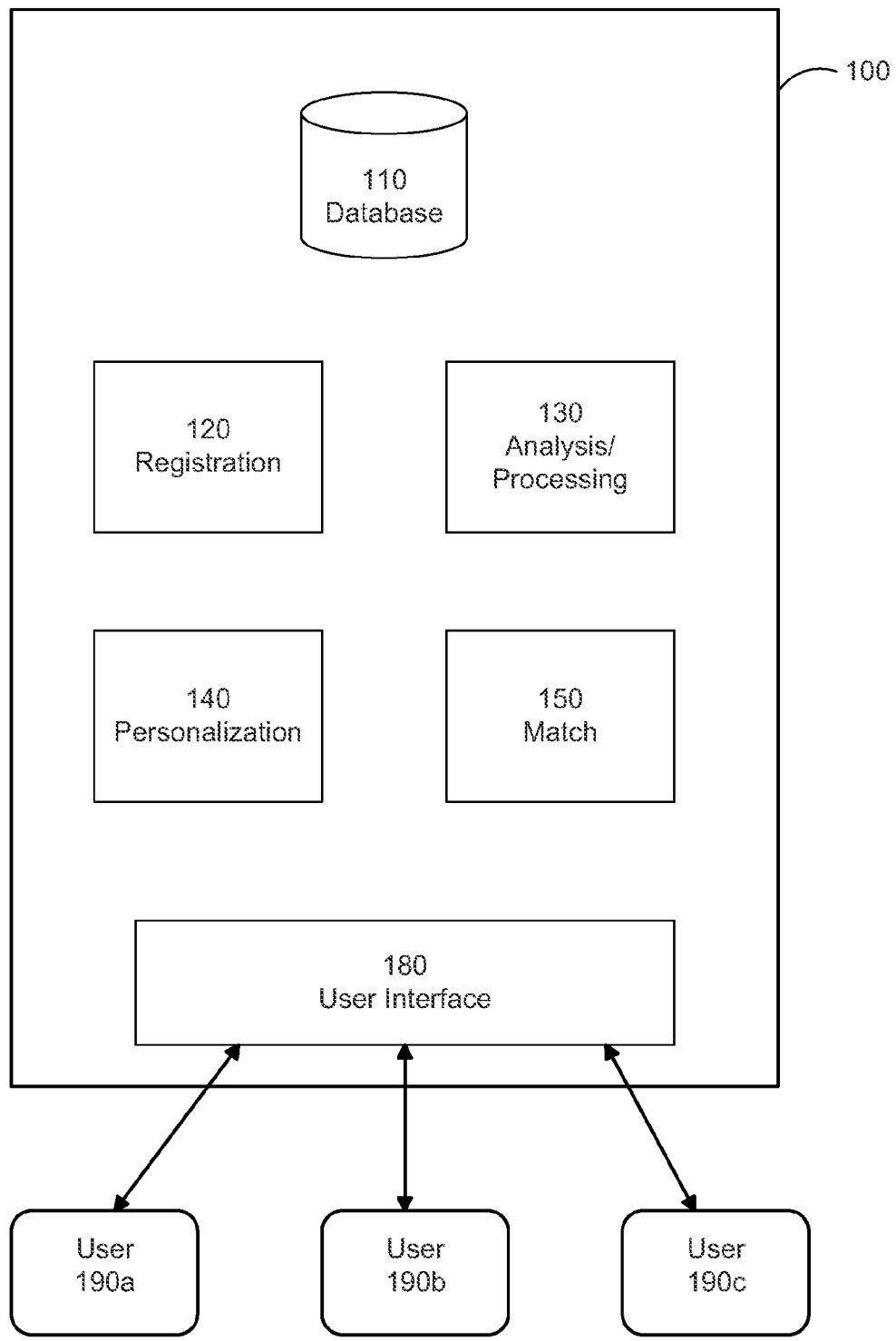
FIG. 1 is a block diagram of a computer system for selecting candidate matches for an individual.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. To facilitate understanding, identical reference numerals have been used where possible, to designate identical elements that are common to the figures.

FIG. 1 is a block diagram of a computer system 100 for selecting candidate matches for an individual. The computer system 100 interacts with users 190 via a user interface 180. For example, the user interface 180 may be a graphical user interface, a web-based user interface, a touch screen, a user interface to a mobile phone or other mobile computing device, etc. The users 190a, 190b, 190c represent different people, each of whom can independently interact with the system 100 via a user interface 180. Although only three users are shown, it is understood that in practice there may be an arbitrary number of users and each user may interact with the computer system via the same or a different type of user interface 180. An example of computer system 100 would be an internet dating site, where the users 190 are members and/or potential dates.

The users 190 can interact with the user interface 180 via a keyboard, a mouse, a stylus, etc. Embodiments of the invention allow the users 190 to remotely interact with the computer system 100 through wired or wireless connections (e.g., accessing a webpage using internet). The users 190 can interact with the computer system 100 via different types of computing devices, including for example desktop computers, laptop computers, tablets, mobile phones and other mobile computing devices. Other embodiments of the invention allow the users 190 to directly interact with the computer system 100 (e.g., running a stand-alone software application on a local personal computer).

The computer system 100 includes a database 110, a registration module 120, an analysis/processing module 130 (referred to as analysis module hereinafter), a personalization module 140, and a match module 150. In an embodiment, the computer system 100 can be a web site. In other embodiments, the computer system 100 may include additional, fewer, or different modules for various applications. Conventional components such as security mechanisms, load balancers, failover servers, management and network operations consoles, and the like are not shown so as to not obscure details of the system.

The database 110 contains profiles of users 190, among other information. An example user profile will be described more fully below. Typically, the database 110 is accessed and a user profile is set up when a user registers via the registration module 120. The database 110 is also accessed by other modules in the computer system 100, such as the analysis module 130. The database 110 may also contain connections among users, such as a social map. For example, when a match is successfully made, a record of that match may be stored in the database 110 as part of the social map.

The registration module 120 is used to register users 190. As part of the registration process, the registration module 120 creates an account for each user in the computer system 100. The registration process typically takes a user through a number of steps, including asking the user various questions for creating an account such as user name, password, email address, security questions to recover the password, etc. The registration module 120 creates an account for the user. The user can log in using the user name and password provided in the registration process. The registration module 120 may additionally ask the user questions which can later be used to facilitate a match, such as the user's name, age, sex, height, weight, education, hair color, eye color, religion, income, occupation, hobbies, interests, etc. The registration module 120 may also ask questions regarding the user's preferences for a desired match. The registration module 120 saves this information as part of the user's profile. In other embodiments of the invention, users can answer these questions at a later time, that is, after the registration process is finished.

Embodiments of the invention allow users to upload their images as part of the registration process. Alternatively, users may choose to upload their images at a later time, that is, after the registration process is finished. The images uploaded by a user are saved in the database 110 and are typically associated with the user's profile.

The analysis module 130 accesses the database 110 to obtain users' images, and processes them. In one embodiment, the analysis module 130 uses computer vision methods to process an image to produce a feature set. One way to obtain a feature set from an image is to project the image onto its basis vectors, i.e., express the image as a superposition of all its basis-vector components:

$$\text{Image} = \sum_{i=1}^{N} e_i V_i, \qquad (1)$$

where $V_i$ are the basis vectors and $e_i$ are the corresponding weights. In the case of a facial image, $V_i$ can be basic features of a face. For example, $V_1$ may refer to the space between the eyes, $V_2$ may refer to the space between the mouth and the nose, etc. In this example, the feature set (FS) describing the image is defined by a vector of weights: $FS = (e_1, e_2, \ldots, e_N)$.

Other approaches can also be used to obtain other feature sets. For example, unsupervised learning methods can be used. Principal component analysis, independent component analysis and sparse coding are additional approaches. Feature sets can also be obtained through the use of filter banks, for example Gabor energy filters, local binary pattern (LBP) filters, etc.

In some cases, a user's image may be more than a facial image, but may instead be multi-component. For example, such a multi-component image may include the face of the user, the body of the user, and the background. Embodiments of the invention allow using computer vision methods to segment such a multi-component image into its components (e.g., the face, the body, and the background), and to calculate feature sets based on its components.

As an example, the face may be processed using computer vision methods to produce a face feature set ($FS_{face}$). The face feature set may be expressed as a vector of L numbers: $FS_{face} = (p_1, p_2, \ldots, p_L)$. In some instances, the face feature set may be calculated based on processing images of faces for facial expression (happy, sad, etc.). In other cases, the face feature set may be calculated based on processing images of faces that have identifiable features, e.g., hair style, the presence or absence of glasses, etc. The face feature set may also be calculated based on processing images of faces according to a facial action coding system. For example, some of the numbers in the vector $FS_{face}$ may correspond to the presence or absence of specific action units in the facial action coding system. Alternatively, the face feature set may also be calculated based on applying Gabor energy filters and/or LBP filters to the facial image. The face feature set may also be obtained through a combination of the above methods. The above methods are examples and are not meant to be exhaustive.

As another example, the body may be processed using computer vision methods to produce a body feature set ($FS_{body}$). The body feature set may be expressed as a vector of M numbers: $FS_{body} = (q_1, q_2, \ldots, q_M)$. In some cases, the body feature set may be calculated based on processing the body image. For instance, some numbers in the $FS_{body}$ vector may correspond to whether the body in the image is fat, slim, fit, etc. In other cases, the body feature set may be calculated based on processing the image of people's clothing in the body image. For example, the person in the image may be wearing a tuxedo, and the information about the tuxedo in the image is processed to be represented by some numbers in the $FS_{body}$ vector. Alternatively, the body feature set may also be calculated based on applying Gabor energy filters and/or LBP filters to the body image. The body feature set may also be obtained through a combination of the above methods. The above methods are examples and are not meant to be exhaustive.

The background may also be processed using computer vision methods to produce a background feature set ($FS_{back}$). The background feature set may be expressed as a vector of N numbers: $FS_{back}=(r_1, r_2, \ldots, r_N)$. The integers L, M and N may be different. In some cases, the background feature set may be calculated based on processing the background image. For instance, some numbers in the $FS_{back}$ vector may correspond to whether the background in the image is a beach, a mountain, a bar, an office, etc. In other cases, the presence or absence of specific objects in the background may correspond to some numbers in the $FS_{back}$ vector. For example, the person in the image may be playing volleyball on a beach, and the information about the presence of the volleyball in the image is processed to be represented by some numbers in the $FS_{back}$ vector. Alternatively, the background feature set may also be calculated based on applying Gabor energy filters and/or LBP filters to the background image. The background feature set may also be obtained through a combination of the above methods. The above methods are examples and are not meant to be exhaustive.

The total feature set, FS, may be represented as various combinations of the different features sets $FS_{face}$, $FS_{body}$, and $FS_{back}$. In one approach, each feature set can be weighted differently so that the total feature set $FS=[A*FS_{face}, B*FS_{body}, C*FS_{back}]$, where A, B, and C are the corresponding weights for the face feature set, the body feature set, and the background feature set, respectively. Each component feature set (i.e., face, body, background) may be a multi-dimensional vector and their dimensionalities may be different.

As described above, different feature sets can be calculated based on different users' images. These feature sets can be used to predict candidate matches for users. For example, if one user is looking for a certain type of person, a filter may be calculated for that individual reflecting what the user is looking for. That filter can then be applied to the feature sets of the other individuals to select candidate matches from among the other users. For purposes of illustration, the user for whom matches are being sought will be referred to as the individual. The users in the database 110 that are being considered for matching will be referred to as the potential applicants. The users selected for the individual will be referred to as the candidate matches. Note that users can play different roles in different context. A user may be an individual when he is looking for matches, a potential applicant when he is in the pool of people being considered by another user, and either a candidate match or not depending on whether he was selected.

Returning to FIG. 1, the personalization module 140 calculates a filter for the individual. This filter is calculated by processing images of people in conjunction with the individual's preferences with respect to those images. More detailed discussions on how to calculate a filter will be provided in the context of FIG. 4. In one embodiment, the filter is a model that can be trained, for example, using machine learning methods. In another embodiment, images of people are processed into feature sets using some of the computer vision methods described above. The individual's preferences with respect to those images are represented as scores. For example, such a score can range from 0 to 100. A score of 0 may mean that the image is the least attractive to the individual and a score of 100 may mean that the image is the most attractive to the individual. The feature sets and their corresponding scores are processed in conjunction with each other to develop a filter for the individual.

Embodiments of the invention allow the filter to adapt over time based on the individual's preferences to images of people. For example, once a filter is trained, it is not fixed. Instead, the filter can be further trained by processing new images of people together with the individual's preferences with respect to those new images. In this sense, the filter is adaptive. For example, training of the filter may start the first time that the individual browses through images of users and rates which ones he prefers. However, this process may continue over time as the individual continuously views new user images and rates them.

The match module 150 applies the individual's filter to the feature sets calculated by processing images of the potential applicants to select candidate matches for the individual. In one embodiment, the matching result is a binary output. For example, "yes" means there is a good match, and "no" means there is little or no match at all. In other embodiments, the matching result can be a continuous score. For example, such a score can range from 0 to 100. A score of 0 means that there is no match, a score of 100 means that there is a perfect match, and a score of 50 means that the match is acceptable but not outstanding. In some cases, the matching results are shown to the individual, and the individual may verify the results. For instance, the individual may agree with some of the matching scores, while disagreeing with other matching scores. The individual may be given the option of overwriting the matching scores that he/she disagrees with. This feedback can be used by the personalization module 140 to further train the individual's filter.

Embodiments of the invention facilitate online dating. Dating is generally more effective if there is two-way matching. The fact that a user Alice matches to another user Bob does not guarantee that Bob will match to Alice. To increase the likelihood of dating success, Alice can send a dating request to Bob, and Bob can apply his filter to Alice's profile to determine if there is also a good match in this direction. In one embodiment, Bob may actually manually review Alice's profile (including her images and other personal information). In other embodiments, Bob may apply his filter after the dating request is sent from Alice. In other embodiments, Bob's filter has already been applied to determine matching with Alice, and the matching result is available (e.g., stored in the database 110) before the dating request is sent from Alice. Once Bob has the matching result, he can then decide whether to accept Alice's dating request.

Figure 2:
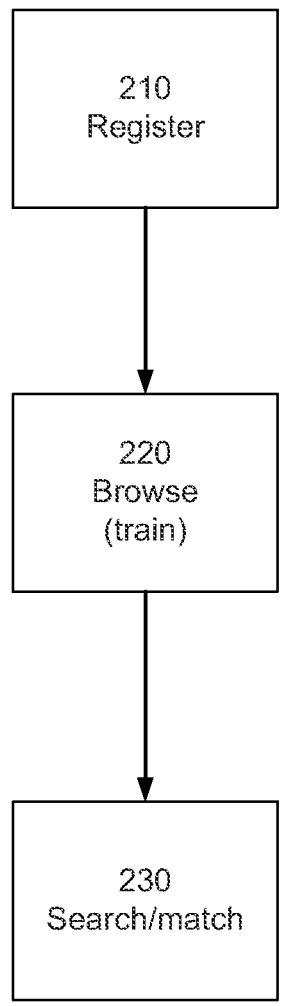
FIG. 2 is a flow diagram of a process for operating the computer system of FIG. 1.

FIG. 2 is a flow diagram of a process for operating the computer system 100 of FIG. 1. For illustration purposes, let's call the individual Jack. Jack registers 210 via the registration module 120. Jack then browses 220 images of people, and gives his preferences with respect to those images. In some cases, these images may be from other registered users. In other cases, these images may be from people who are not users of the computer system 100. For example, these images may be collected from other internet websites and are used as "generic" images for training purposes. For any given image that Jack browses, he may be queried to give it a score ranging from 0 to 100 (e.g., 0 means the least attractive and 100 means the most attractive), or he may simply give a yes/no answer (e.g., he likes the image of Susan, he doesn't like the image of Sarah, etc.). In effect, this browsing 220 provides feedback to the computer system 100 to allow the personalization module 140 to calculate (i.e., train) Jack's filter. The browse/train step 220 may be stopped by Jack (e.g., when Jack feels that he has done enough browsing), or it may be stopped by the computer system 100 (e.g., the system may have a preset number of images to browse; upon reaching this number, the system stops the browse/train step).

Jack then goes on to the search/match step 230. This step is done via the match module 150, with assistance from the analysis module 130 and Jack's filter calculated by the personalization module 140. At the end of step 230, the system may show Jack a list of candidate matches via the user interface 180. Jack may have the option of further selecting from the candidate matches those potential applicants that he is really attracted to.

Figure 3:
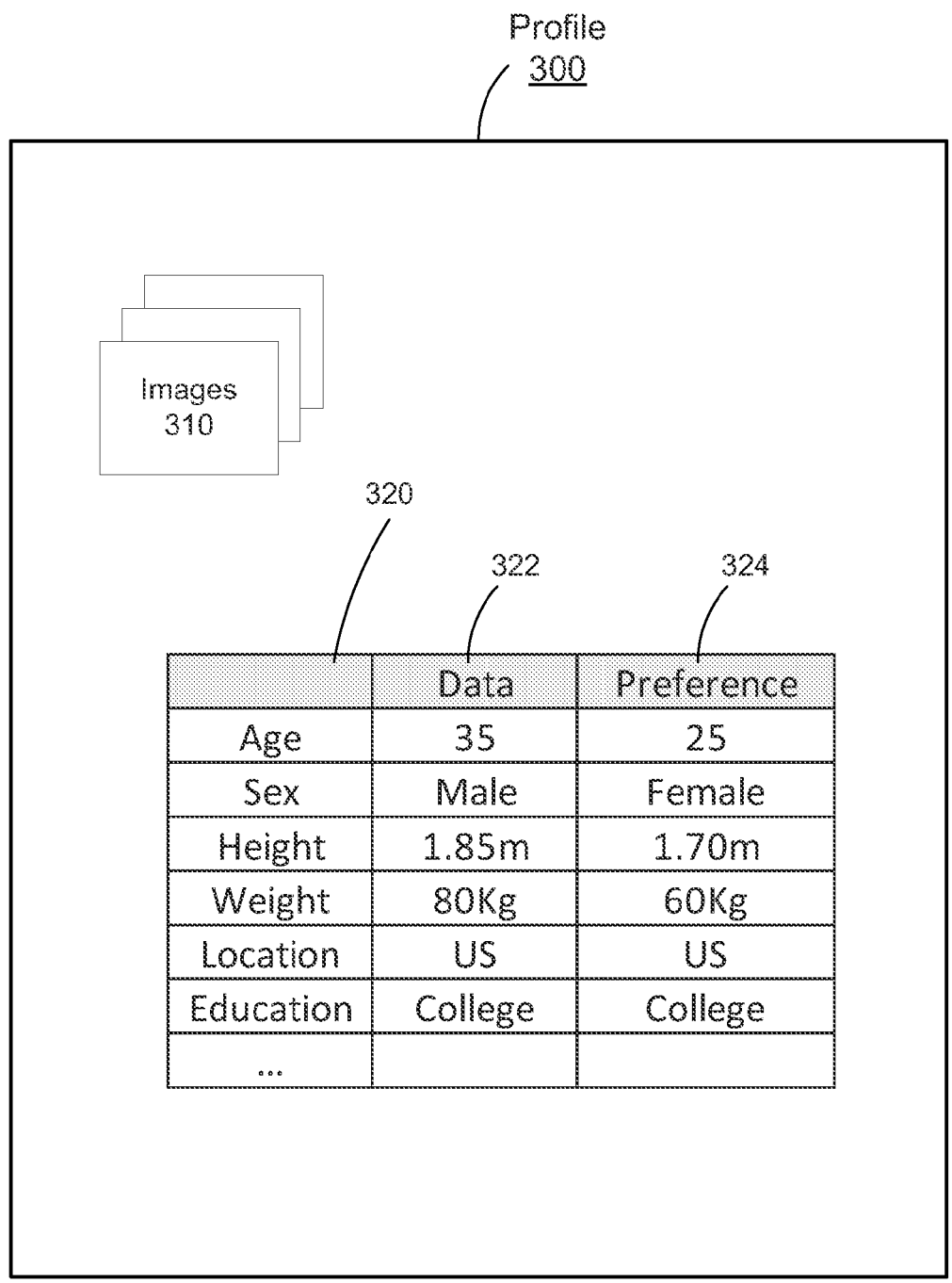
FIG. 3 is an example profile of a person contained in the database of FIG. 1.

FIG. 3 is an example profile of a person contained in the database 110 of FIG. 1. The profile 300 contains images 310 and questionnaire information 320. There can be multiple images 310 in a user profile, and the images 310 can be of different types. For example, some images may be facial images only, while other images may have face, body, and background. Some images may be in an office setting, yet other images may be in an outdoor setting, such as a beach. In one embodiment, a user can designate one image as the profile image. In some cases, some of the images 310 may have not only the user, but also the user's friends in them. It is desirable that the computer system 100 be able to identify the user, and separate the user from the user's friends. In some cases, having multiple images 310 in the user profile 300 is advantageous because it may increase the reliability of the matching process. A person may look differently from different angles and/or in different settings. By having different images of the person taken from different angles and/or in various settings, an "average" effect can be produced and a more reliable representation of the person may be obtained.

The questionnaire information 320 in this example includes two parts: personal data 322 and personal preferences 324. In FIG. 3, the questionnaire information 320 is in the form of a table. The table format is shown here for illustration purposes only. In practice, any data type can be used for storing the questionnaire information, such as arrays, vectors, strings, etc. In this table example, the first column is a list of attributes, such as the person's age, sex, height, weight, location, education, etc. The second column 322 contains the values of the attributes that the user provides about himself/herself. In this example, the user for this profile is 35 years old, male, etc. The third column 324 contains the values of the attributes that the user prefers. In this example, the user prefers 25 years old, female, etc. In some cases, some of the preferences may be an exact number. For example, the preferred age is 25. In other cases, some preferences may be a fuzzy number, or a range of numbers. For example, the preferred age may be a range from 20 to 30.

The personal data 322, the personal preferences 324, or a combination of the two, can be processed to produce a user vector that characterizes the user. In some embodiments, the user's images are also processed into a part of the user vector. The similarity between different users may be measured as the "distance" between the different user vectors. For example, let the user vector $\vec{A}$ represent a vector of numbers that characterizes user A, and the user vector $\vec{B}$ represent a vector of numbers that characterizes user B. The similarity between A and B is defined as $S=|\vec{A}-\vec{B}|$, where $|\vec{V}|$ is the modulus of vector V. The similarity is high when S is small, and the similarity is low when S is large.

In one embodiment, the individual's filter may also be tagged or otherwise associated with a user vector that characterizes the individual. This user vector can be used to facilitate collaborative training of the individual's filter. In one approach, a group of other users who have similar preferences as said individual is identified, for example based on similarity of the user vectors. The individual's filter is trained based on the similar users' preferences with respect to images of people, in addition to the individual's own preferences. The assumption is that "similar" users tend to have "similar" preferences, although "similar" may be identified in many different ways.

Identifying groups of similar users may be advantageous in some cases. For example, when an individual is first registered, the system can identify a group of users who are similar to the individual, and start the filter calculation process by showing the individual those images of people that are preferred by the individual's similar users. The individual's filter can be quickly calculated because "the starting point is in the right neighborhood." In an embodiment, groups of similar users may be identified by first soliciting responses to certain questions that are asked of all users, and then identifying groups of users that have similar responses to those questions.

Embodiments of the invention allow using the questionnaire information 320 to further select matches for the individual, in addition to using the individual's image-based filter. For example, the individual's personal preferences can be used to match the potential applicants' personal data. This acts like a "questionnaire filter," which may help further narrow down the candidate matches selected based on the individual's image-based filter.

The image-based filter and the questionnaire filter may act independently, or in conjunction with each other. In one embodiment, for any given user profile 300, the image-based filter produces a matching score—an image score, and the questionnaire filter produces another matching score—a questionnaire score. The final matching score may be represented by the sum of the image score and the questionnaire score. In this way, deficiency in one score may be offset by the other score. In some cases, only the final matching score is provided as a reliable measure of matching likelihood. In other cases, all three scores are provided, and the individual can decide (either directly or indirectly) which score to use in selecting matches.

Figure 4:
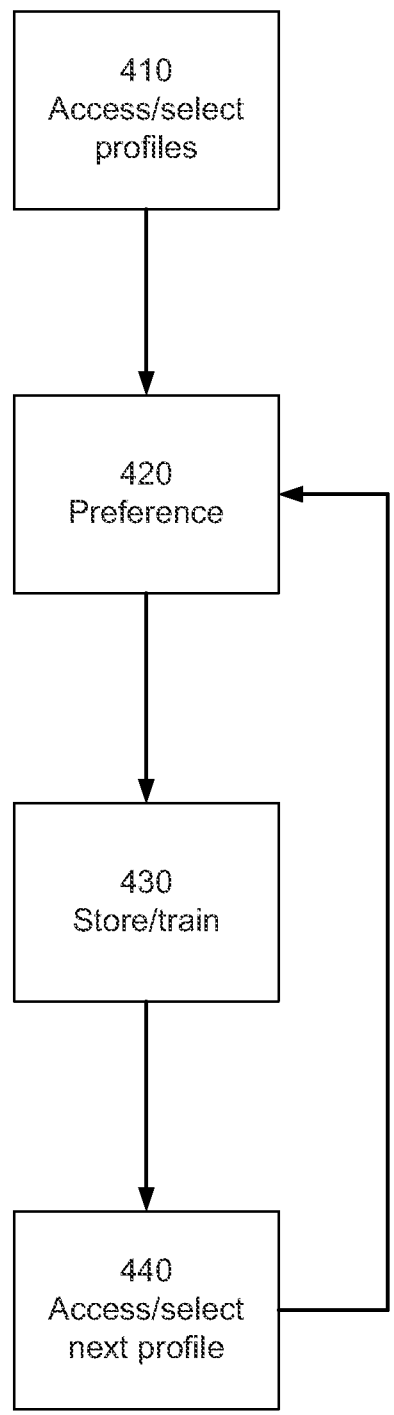
FIG. 4 is a flow diagram of a process for browsing potential applicants.

FIG. 4 is a flow diagram of a process for browsing potential applicants. Again, let's call the individual Jack for illustration purposes. Assume that Jack has already registered with the computer system 100, and has already logged in. Jack accesses 410 the database 110 to select user profiles 300. In one embodiment, an image of a potential applicant is shown to Jack. Jack is then queried for his preference 420 with respect to the image. In one embodiment, the preference can be in the form of a score ranging from 0 to 100, with 0 being the least attractive and 100 being the most attractive. The personalization module 140 then uses the image and Jack's corresponding preference as a training set to train Jack's filter. During this process, Jack's preference is stored in the database 110 and his filter is trained 430. Jack can select 440 the next image after he has given his preference with respect to the current image. In some cases, Jack can skip the current image if he does not want to give a preference with respect to that image, and goes on to select 440 the next image.

In one embodiment, the images of potential applicants shown to Jack are processed into feature sets by the analysis module 130. A feature set (FS) can be represented by the weights: $FS=(e_1, e_2, \ldots, e_N)$, where the $e_i$ ($i=1, 2, \ldots, N$) are the weights corresponding to the basis vectors of an image. Jack's filter applied to an image (actually, applied to the feature set of the image) may produce an output of:

$$F = \sum_{i=1}^{N} s_i e_i, \quad (2)$$

where $s_i$ (i=1, 2, ..., N) are the parameters of Jack's filter. In general, the filter can be any function that operates on the feature set. The above linear function is just a simple example. The process of training the filter is to determine the parameters of the filter $s_i$ (i=1, 2, ..., N) through input of feature sets and Jack's corresponding preferences. For instance, for any given input feature set, the output of the filter should be the corresponding score that represents Jack's preference with respect to that image. Essentially, the parameters of the filter may be determined by solving the following set of equations:

$$\sum_{i=1}^{N} s_i (e_i)_k = score_k, \quad (3)$$

where k is an integer, $(e_i)_k$ is the weight for the $i^{th}$ basis vector in the $k^{th}$ image, and $score_k$ is the score for the $k^{th}$ image.

As another example, consider the case where the total feature set FS is represented as a weighted sum of its component feature sets, i.e., the face feature set $FS_{face} = (p_1, p_2, ..., p_L)$, the body feature set $FS_{body} = (q_1, q_2, ..., g_M)$ and the background feature set $FS_{back} = (r_1, r_2, ..., r_N)$. The output after application of the total filter can be written in the following form:

$$F = \sum_{i=1}^{L} a_i p_i + \sum_{j=1}^{M} b_j q_j + \sum_{k=1}^{N} c_k r_k, \quad (4)$$

where $a_i$ (i=1, 2, ..., L), $b_j$ (j=1, 2, ..., M), $c_k$ (k=1, 2, ..., N) are the parameters of the total filter. These parameters are determined by solving the following set of equations:

$$A^* \sum_{i=1}^{L} a_i (p_i)_t + B^* \sum_{j=1}^{M} b_j (q_j)_t + C^* \sum_{k=1}^{N} c_k (r_k)_t = score_t, \quad (5)$$

where t is an integer, $(p_i)_t$ is the weight for the $i^{th}$ face basis vector in the $t^{th}$ image, $(q_j)_t$ is the weight for the $j^{th}$ body basis vector in the $t^{th}$ image, $(r_k)_t$ is the weight for the $k^{th}$ background basis vector in the $t^{th}$ image, and $score_t$ is the score for the $t^{th}$ image.

Figure 5:
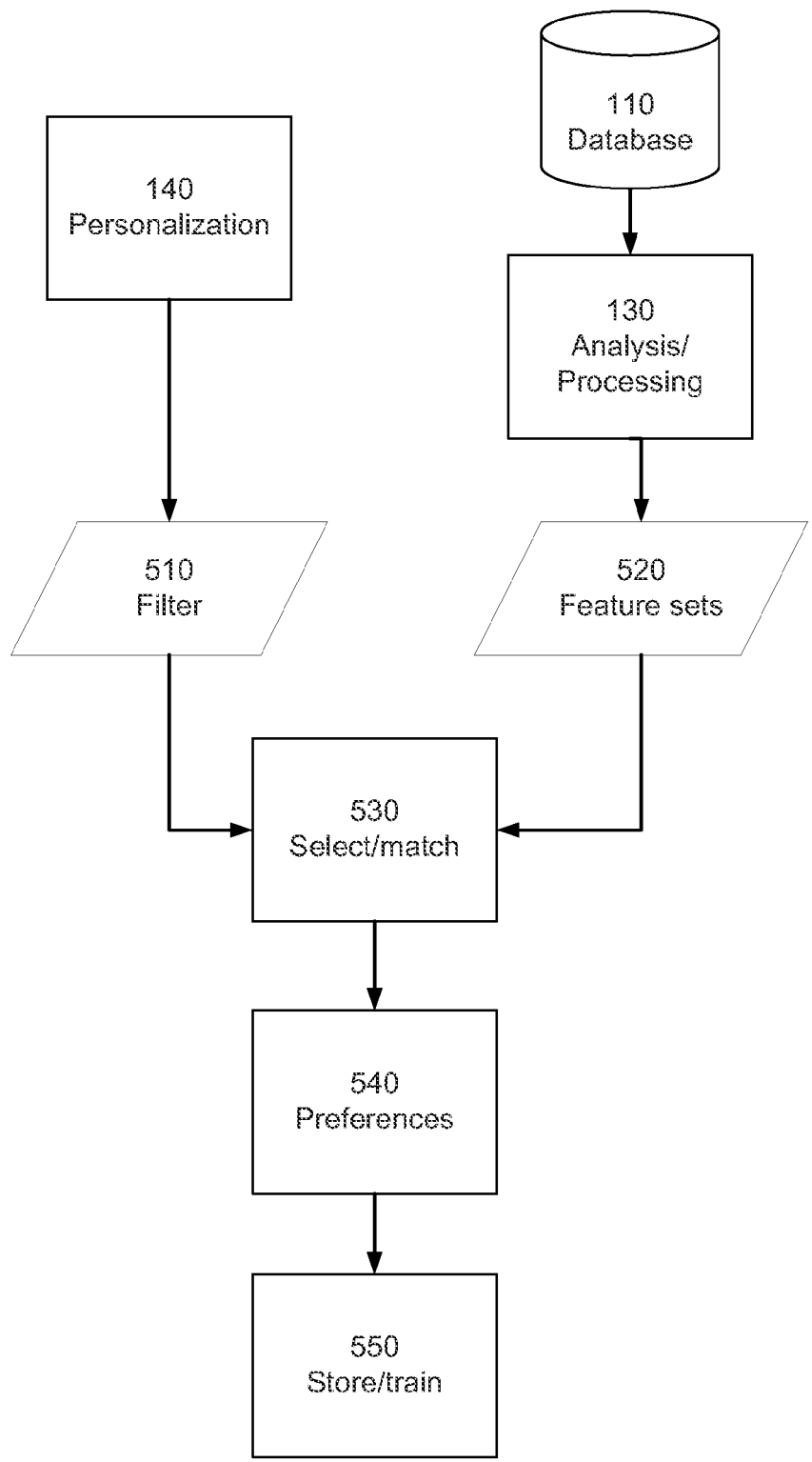
FIG. 5 is a flow diagram of a process for selecting candidate matches for an individual.

FIG. 5 is a flow diagram of a process for selecting candidate matches for an individual. For illustration purposes, let's call the individual Jack. The personalization module 140 calculates Jack's filter 510. Jack's filter 510 is calculated by processing images of people in conjunction with Jack's preferences with respect to those images. The database 110 is accessed to obtain potential applicants' profiles 300. The analysis module 130 calculates feature sets 520 for the potential applicants. The feature sets 520 are calculated by processing images of the potential applicants using one of the abovementioned methods, for example. The filter 510 is applied to each of the feature sets 520 at the step of select/match 530. The result is a list of predicted preferences 540 of the potential applicants, based on Jack's filter 510 and the feature sets 520. For example, suppose Jack's filter 510 is described by Eq. (4), where all the parameters have been determined by the personalization module 140. Further suppose that each of the feature sets 520 is described by a face feature set, a body feature set and a background feature set as described above. The predicted preference for the $t^{th}$ feature set may be represented by:

$$score_t = A^* \sum_{i=1}^{L} a_i (p_i)_t + B^* \sum_{j=1}^{M} b_j (q_j)_t + C^* \sum_{k=1}^{N} c_k (r_k)_t, \quad (6)$$

where $score_t$ is the predicted score for the $t^{th}$ feature set, and parameters on the right hand side of Eq. (6) are defined previously.

In one embodiment, the list of predicted preferences 540 together with the corresponding images is shown to Jack, and Jack can optionally verify the predicted preferences. If a predicted score is accepted by Jack, it is stored and may not be used to further train 550 Jack's filter. If a predicted score is corrected by Jack, it is stored and may be used to further train 550 Jack's filter. If a predicted score is skipped by Jack (i.e., it does not have Jack's verification), it is discarded and may not be used to further train 550 Jack's filter.

In one embodiment, the list of predicted preferences 540 is sorted by the scores, and then shown to Jack together with the corresponding images. For example, the potential applicant with the best score is shown on the top of the list 540, while the potential applicant with the worst score is shown on the bottom of the list 540. In some cases, the list 540 of "image scores" may be augmented by another list of "questionnaire scores" to help Jack refine his choices. As mentioned previously, the questionnaire scores are produced by matching Jack's personal preferences with the potential applicants' personal data. Jack may be able to make more informed decisions by having access to both lists of scores.

In some approaches, Jack gets a list of candidate matches, which may be pre-sorted based on the image score, the questionnaire score, or the total score (i.e., the sum of the image score and the questionnaire score). If the list of candidate matches is un-sorted, Jack can have the option of sorting the list based on any of the abovementioned scores. Jack uses his own judgment to "fine tune" the list of candidate matches. For example, he may move the candidate previously listed as No. 5 up to No. 1, and change the candidate's image score. He may downgrade the candidate previously as No. 1 to No. 10, and change the candidate's image score. The updated list of candidate matches is stored in the database 110, and can be reviewed later.

In one embodiment, the selection of potential applications' profiles 300 is designed to satisfy a trade-off between the following two factors. On the one hand, the system selects some potential applicants that the system believes Jack will likely find attractive. The goal is to provide as many good candidate matches for Jack as possible. For example, if the system finds out that Jack likes people possessing large eyes with a fit body in a beach background, the system will try to find potential applicants matching the above requirements. The matching may not be exact. In some cases, the matching can be "fuzzy". For example, if potential applicants exactly matching those requirements cannot be found, the system will provide potential applicants matching two, or even only one, of the above requirements. On the other hand, the system selects some potential applicants that the system does not know if Jack will find attractive or not. The goal is to learn as much as possible about Jack's preferences, so that the system can refine Jack's filter. As an example, if the system finds out that Jack likes people possessing large eyes with a fit body in a beach background, the system may probe Jack's interests in people possessing a small nose dressed in a casual outfit in a bar background. The above trade-off selection strategy can be implemented using a variety of approximation methods for optimal control, such as reinforcement learning algorithms.

Figure 6A:
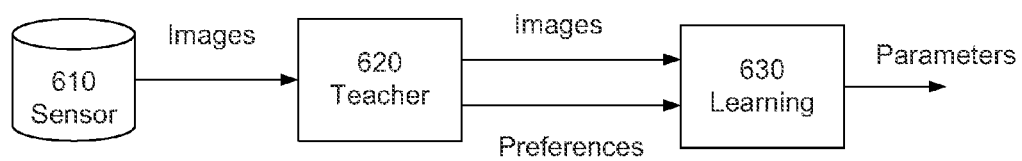
FIG. 6A-6C are flow diagrams illustrating training of the computer system of FIG. 1.
Figure 6B:
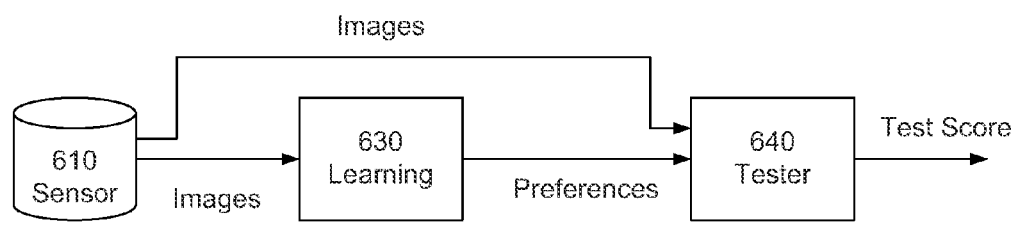
Figure 6C:
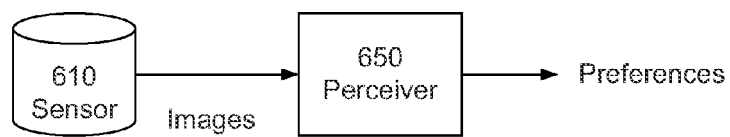

FIG. 6A-6C are flow diagrams illustrating training of the computer system of FIG. 1. With respect to supervised machine learning systems, modules can often be classified according to the role played by that module: sensor, teacher, learner, tester and perceiver, for example. FIGS. 6A-C illustrate these roles, using the personalization module 140 from FIG. 1. The goal is to train the personalization module 140 to produce a filter that can predict an individual's preferences for received images. FIG. 6A illustrates supervised learning through use of a training set. FIG. 6B illustrates testing to determine whether the supervised learning has been successful. FIG. 6C illustrates operation after learning is sufficiently completed.

Beginning with FIG. 6A, sensor modules provide initial data as input to other modules. In the example of FIG. 6, the sensor module 610 provides images of people. Teacher modules provide the supervised learning. They receive input data and provide the corresponding training outputs. In FIG. 6A, the teacher module 620 receives images of people from sensor module 610 and provides the "right answer," i.e., the preference for each image. The teacher module 620 may calculate the training output or it may obtain the training output from another source. For example, the individual, for whom the filter is being trained, may have manually determined the preference for each image, and the teacher module 620 simply accesses a database to return the correct preference for each image. The learning module 630 is the module being trained by the teacher module 620. In this case, the learning module 630 is learning to estimate preferences from images of people. In many cases, the learning module 630 includes a parameterized model of the task at hand, and the learning process uses the training set to adjust the values of the numerical parameters of the model. In some cases, including the example of FIG. 6A, the learning module 630 outputs the values for the numerical parameters. Many machine learning methods may be used, including Support Vector Regression, Boosting, and Gaussian processes.

In FIG. 6B, a tester module 640 determines how well the learning module 630 has been trained. The sensor module 610 provides images of people to the trained learning module 630, which outputs its estimate of preferences. The tester module 640 also receives the images of people and determines the correct preferences. It compares the correct preferences with those predicted by the learning module 630. In this way, it can determine how well the learning module 630 is performing. Many times, the teacher module 620 can also be used as the tester module 640.

Once the learning module 630 is trained, it can perform tasks on other input data, as shown in FIG. 6C. When used in this operational mode, the learning module 630 will be referred to as a perceiver module 650. The perceiver module 650 may not be identical to the learning module 630. For example, the perceiver module 650 may be stripped of any learning ability. In FIG. 6C, the sensor module 610 provides new images of people to the perceiver module 650, which then outputs the estimated preferences.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these, although in these embodiments they are most likely software. Furthermore, different modules can share common components or even be implemented by the same components. There may or may not be a clear boundary between different modules.

Depending on the form of the modules, the "coupling" between modules may also take different forms. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer-implemented method for selecting candidate matches for an individual from a database of potential applicants, the method comprising a computer system performing the steps of:
   creating a training set comprising a plurality of images of people paired with the individual's corresponding preferences with respect to those images;
   using the training set to train a filter for the individual, the filter learning the individual's preferences by, for each of multiple images in the training set, processing (a) a feature set calculated by processing that image from the training set in conjunction with (b) the individual's corresponding preference with respect to that image;
   calculating feature sets for the potential applicants, the feature sets calculated by processing images of the potential applicants; and
   applying the individual's filter to the feature sets to select candidate matches for the individual.

2. The method of claim 1 wherein the step of creating the training set comprises:
   showing the images of people to the individual; and
   querying the individual for the individual's preferences with respect to those images.

3. The method of claim 1 wherein the step of training the filter comprises the filter adapting over time based on the individual's preferences to images of people.

4. The method of claim 1 wherein the step of training the filter comprises:
   identifying a group of other individuals who have similar preferences as said individual; and
   training the filter based on the other individuals' preferences with respect to images of people.

5. The method of claim 4 wherein the step of identifying a group of other individuals who have similar preferences as said individual comprises:
   soliciting responses to questions asked of the individuals; and
   identifying groups of individuals based on similarity of their responses.

6. The method of claim 1 wherein the step of training the filter comprises training the filter via machine learning.

7. The method of claim 6 wherein the step of training the filter via machine learning comprises using reinforcement learning algorithms.

8. The method of claim 1 wherein the feature sets are vectors of numbers.

9. The method of claim 1 wherein calculating the feature sets for the images in the training set is based on processing images of faces of people, and the step of calculating feature sets for the potential applicants is based on processing images of faces of the potential applicants.

10. The method of claim 9 wherein calculating the feature sets for the images in the training set is based on processing images of faces of people for facial expression, and the step of calculating feature sets for the potential applicants is based on processing images of faces of the potential applicants for facial expression.

11. The method of claim 9 wherein calculating the feature sets for the images in the training set is based on processing images of identifiable features in faces of people, and the step of calculating feature sets for the potential applicants is based on processing images of the identifiable features in faces of the potential applicants.

12. The method of claim 9 wherein the step of calculating feature sets for the potential applicants comprises segmenting images of faces from images of the potential applicants.

13. The method of claim 9 wherein calculating the feature sets for the images in the training set is based on processing images of faces of people according to a facial action coding system, and the step of calculating feature sets for the potential applicants is based on processing images of faces of the potential applicants according to the facial action coding system.

14. The method of claim 1 wherein the step of calculating feature sets for the potential applicants comprises:
   segmenting the images of the potential applicants into face, body and background; and
   calculating the feature sets based on the face, body and background.

15. The method of claim 1 wherein calculating the feature sets for the images in the training set is based on processing images of bodies of people, and the step of calculating feature sets for the potential applicants is based on processing images of bodies of the potential applicants.

16. The method of claim 1 wherein calculating the feature sets for the images in the training set is based on processing images of people's clothing, and the step of calculating feature sets for the potential applicants is based on processing images of the potential applicants' clothing.

17. The method of claim 1 wherein calculating the feature sets for the images in the training set is based on the filter is calculated by processing backgrounds in images of people, and the step of calculating feature sets for the potential applicants is based on processing background in images of the potential applicants.

18. The method of claim 1 wherein calculating the feature sets for the images in the training set is based on processing images of identifiable features of people, and the step of calculating feature sets for the potential applicants is based on processing images of the identifiable features of the potential applicants.

19. The method of claim 1 wherein calculating the feature sets for the images in the training set is based on applying Gabor energy filters to images of faces of people, and the step of calculating feature sets for the potential applicants is based on applying Gabor energy filters to images of faces of the potential applicants.

20. The method of claim 1 wherein calculating the feature sets for the images in the training set is based on applying local binary pattern filters to images of faces of people, and the step of calculating feature sets for the potential applicants is based on applying local binary pattern filters to images of faces of the potential applicants.

21. The method of claim 1 wherein the database of potential applicants is a database of potential dates for the individual, and the candidate matches are candidates dates for the individual.

22. The method of claim 1 further comprising:
   accessing the individual's profile, wherein the individual's profile contains information provided by the individual about the individual's preferences;
   accessing the potential applicants' profiles, wherein the potential applicants' profiles contain information provided by the potential applicants related to the individual's preferences; and
   further selecting candidate matches for the individual based on the information in the individual's profile and in the potential applicants' profiles.

23. A tangible non-transitory computer readable medium containing instructions that, when executed by a processor, execute a method for selecting candidate matches for an individual from a database of potential applicants, the method comprising:
   creating a training set comprising a plurality of images of people paired with the individual's corresponding preferences with respect to those images;
   using the training set to train a filter for the individual, the filter learning the individual's preferences by, for each of multiple images in the training set, processing (a) a feature set calculated by processing that image from the training set in conjunction with (b) the individual's corresponding preference with respect to that image;
   calculating feature sets for the potential applicants, the feature sets calculated by processing images of the potential applicants; and
   applying the individual's filter to the feature sets to select candidate matches for the individual.

24. A system for selecting candidate matches for an individual from a database of potential applicants, the system comprising:
   means for creating a training set comprising a plurality of images of people paired with the individual's corresponding preferences with respect to those images;
   means for using the training set to train a filter for the individual, the filter learning the individual's preferences by, for each of multiple images in the training set, processing (a) a feature set calculated by processing that image from the training set in conjunction with (b) the individual's corresponding preference with respect to that image;

means for calculating feature sets for the potential applicants, the feature sets calculated by processing images of the potential applicants; and means for applying the individual's filter to the feature sets to select candidate matches for the individual.

25. A computer system for assisting an individual to find a date, the computer system comprising:

a database of potential dates;

an initialization module for creating a training set comprising a plurality of images of people aired with the individual's corresponding preferences with respect to those images;

a personalization module that uses the training set to train a filter for the individual, the filter learning the individual's preferences by, for each of multiple images in the training set, processing (a) a feature set calculated by processing that image from the training set in conjunction with (b) the individual's corresponding preference with respect to that image;

an analysis module that calculates feature sets for the potential dates, the feature sets calculated by processing images of the potential dates;

a match module that applies the individual's filter to the feature sets to select candidate dates for the individual; and a user interface to display the selected candidate dates.

* * * * *